United States Patent
Blanc

(10) Patent No.: US 10,795,462 B2
(45) Date of Patent: Oct. 6, 2020

(54) DEVICE FOR ENTRY ON A TOUCH-SENSITIVE SURFACE AND CORRESPONDING METHOD

(71) Applicant: Ingenico Group, Paris (FR)

(72) Inventor: Olivier Blanc, Pont de l'Isere (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 16/118,009

(22) Filed: Aug. 30, 2018

(65) Prior Publication Data

US 2019/0064949 A1 Feb. 28, 2019

(30) Foreign Application Priority Data

Aug. 31, 2017 (FR) ...................................... 17 58054

(51) Int. Cl.
| | | |
|---|---|---|
| *G06F 3/0354* | (2013.01) | |
| *G06F 3/041* | (2006.01) | |
| *G09B 21/00* | (2006.01) | |
| *G06F 3/0488* | (2013.01) | |
| *G06F 21/83* | (2013.01) | |

(52) U.S. Cl.
CPC ........ *G06F 3/03547* (2013.01); *G06F 3/0412* (2013.01); *G06F 3/04886* (2013.01); *G06F 21/83* (2013.01); *G09B 21/003* (2013.01)

(58) Field of Classification Search
CPC .................................................. G06F 3/03547
See application file for complete search history.

(56) References Cited

U.S. PATENT DOCUMENTS

| | | | |
|---|---|---|---|
| 2003/0235452 A1* | 12/2003 | Kraus | ..................... B41J 5/102 400/472 |
| 2011/0248947 A1 | 10/2011 | Krahenbuhl et al. | |
| 2013/0302777 A1 | 11/2013 | Tomkins et al. | |
| 2015/0138098 A1 | 5/2015 | Potter | |
| 2015/0205370 A1 | 7/2015 | Morris | |

FOREIGN PATENT DOCUMENTS

DE 102012100717 A1 8/2013

OTHER PUBLICATIONS

English Translation of French Written Opinion dated Apr. 23, 2018 for corresponding French Application No. 1758054 filed Aug. 31, 2017.
French Search Report dated Apr. 23, 2018 for corresponding French Application No. 1758054 filed Aug. 31, 2017.
French Written Opinion dated Apr. 23, 2018 for corresponding French Application No. 1758054 filed Aug. 31, 2017.

* cited by examiner

*Primary Examiner* — Gustavo Polo
(74) *Attorney, Agent, or Firm* — David D. Brush; Westman, Champlin & Koehler, P.A.

(57) ABSTRACT

A device for entering data, to be laid down on a touchpad of a terminal. The device includes a generally parallelepiped-shaped plate, the plate including an upper face, at least one part of which includes a keypad-forming matrix of entry zones, such that the thickness of the entry zones is sufficient to enable a detection of a finger by the touchpad, and a lower, generally flat face for laying down the device thereon.

16 Claims, 2 Drawing Sheets

DEVICE FOR ENTRY ON A TOUCH-SENSITIVE SURFACE AND CORRESPONDING METHOD

1. CROSS-REFERENCE TO RELATED APPLICATION

This Application claims priority to and the benefit of French Patent Application No. 1758054, filed Aug. 31, 2017, the content of which is incorporated herein by reference in its entirety.

2. FIELD OF THE INVENTION

The present technique relates to the field of data entry devices. More specifically, the present invention relates to an entry device meant to be laid down on a touchpad. The present technique can be applied especially to the entry of confidential codes or personal identification codes on a touch-sensitive surface, for example for visually impaired persons.

3. PRIOR ART

Touch-sensitive screens are widely used to enter data into computerized data-processing systems. For example, mobile telephones, computers, tablets or again payment terminals and automatic teller machines (ATMs) or cash dispensers have touch-sensitive screens to facilitate the entry of data by users.

To make an entry, a user can touch one or more characters on a virtual keypad displayed on the touch-sensitive screen by using a finger or a stylus. It is thus no longer necessary to have a physical keypad to enter text. However, the entry of text using a virtual keypad has drawbacks, especially for visually impaired persons. The fact is that, unlike physical keypads, virtual keypads are displayed on a flat screen and do not enable visually impaired persons to locate their position spatially on the virtual keys.

This drawback is especially inconvenient for payment terminals or automatic teller machines (ATMs) that have a touch-sensitive screen. Indeed, when a visually impaired person uses his bankcard to make a payment or to withdraw cash, he must use his PIN code for authentication. It is not possible for this visually impaired person to enter his PIN code on a virtual keypad displayed on a touch-sensitive screen.

A European directive currently being drafted obliges merchants and bankers to provide a solution for visually impaired persons. The prior-art solution consists in providing an electronic physical keypad connected to a payment terminal, even if a virtual keypad is available on the touch-sensitive screen. The cost of manufacturing payment terminals or automatic teller machines (ATMs) is thus increased without obtaining a solution that is truly worthwhile, especially from the technical and aesthetic viewpoints. Indeed, the physical keypad intended for visually impaired persons has to be secured to prevent hacking, thus increasing cost, and this keypad is generally not aesthetically integrated into the touch-sensitive approach. The problems and issues are the same for communications terminals that get temporarily converted into payment terminals to carry out a payment operation on a touch-sensitive communications terminal (smartphone or tablet), and the visually impaired person is often obliged to ask a third party for help to enter his bank particulars. Very often, in these situations, there is not even an existing physical keypad that can be added to the communications terminal.

There is thus a need for a solution enabling visually impaired persons to use devices (payment terminal, communications terminal, for example) having touch-sensitive screens to enter data while reducing the cost of this solution and preserving the aesthetic features related to the use of touch-sensitive screens.

4. SUMMARY

An exemplary embodiment of the present disclosure resolves these prior-art problems. An exemplary embodiment makes it possible especially to facilitate entry operations on touch-sensitive screens, especially for visually impaired persons. The solution of one or more exemplary embodiments of the invention however is not limited to use by a visually impaired person and can be used by any person, especially to secure the entry of confidential or non-confidential information, on a touch-sensitive screen.

More particularly, an exemplary embodiment relates to a device for entering data to be laid down on a touchpad of a terminal, an entry device comprising a generally parallelepiped-shaped plate, said plate comprising an upper face, at least one part of which comprises a keypad-forming matrix of entry zones, comprising a set of entry keys such that the thickness of the entry zones is sufficient to enable a detection of a finger by said touchpad, and a lower, generally flat face for laying down said device thereon.

Thus, the terminal on which the device is laid down is capable of detecting the presence of this device as soon as it comes into contact with the touchpad (of the screen) of the terminal through the electrically charged contact zone.

According to one particular embodiment, the lower face furthermore comprises three electrically charged contact zones.

Thus, the entry device intrinsically comprises a signature. This signature is constituted by the three points of contact with the touchpad of the terminal. When the entry device is laid down on a touch-sensitive surface, and more particularly on a capacitive touch-sensitive surface, the layer of the touch-sensitive surface that collects the charges transmits certain of these charges to the three contact points. The terminal is then capable of detecting that these contact points correspond to a particular geometry representing the device for entering data. The terminal can then activate a data entry mode corresponding to entry by means of the device for entering data.

According to one particular characteristic, the device is constituted by transparent plastic.

Thus, the entry device is a secured device: indeed, because of the transparency of the device, it is not possible to attach fraudulent, entry monitoring mechanisms to it. Indeed, if such mechanisms were to be attached, they would be immediately detected because of the transparency of the device for entering data.

According to one particular characteristic, at least one subset of entry keys of the set of entry keys of the matrix of entry zones is generally rectangular in shape.

Thus, apart from this rectangular shape, it is easier, for a visually impaired person, to locate his position in space and therefore use the device for entering data in a simple and intuitive manner.

According to one particular characteristic, the keypad-forming matrix of entry zones comprises a set of keys of a generally plane shape formed by the upper surface of the plate and separated from each other by a grid of profiled elements of predetermined heights and/or shapes Thus, the keys of the keypad are flat and include no specific indication on the function of the key in question. This reinforces security while preventing a malicious individual from watching the keys that are being used for entry. The visually impaired person locates his position by means of the grid of profiled elements that demarcate the keys from each other according to shapes or heights of these profiled elements.

According to one particular characteristic, the shapes of the profiled elements of the grid of profiled elements are suited to forming a plurality of position-locating markers for locating the position of said keys of said keypad.

Thus, a visually impaired person is capable of locating the position of the keys of the keypad on the device by brushing against or touching the profiled elements: we thus define the equivalent of at least one common thread which, when followed by the visually impaired person using one or more fingers, enables him to follow the grid of keys and, in a simple and intuitive manner, identify the place in which such and such a key is situated.

According to one particular embodiment, said set of entry keys comprises 13 keys, said set being sub-divided into a subset of ten numeric keys representing a numeric keypad and a subset of three confirmation keys.

According to one particular characteristic, the position corresponding to key number five has a position-locating point at its center.

According to one particular embodiment, the keypad-forming set of keys is represented by a keypad for entering a confidential code on a payment terminal.

Thus, the visually impaired person can follow the common thread or threads and this position marker (the point) to get a mental picture of the entire keypad and hence very rapidly and very precisely select the locations of keys of this keypad to enter the requested information.

According to one particular characteristic, the thickness of said plate ranges from 1 mm to 3 mm.

Thus, information can be entered without its being necessary to modify the terminal on which the entry device is laid down. Indeed, the thickness of the plate does not work against the operating mechanisms of the touch-sensitive screen which therefore remains usable in the same way. A pressing action, whether it is applied to a "blind" key of the entry device or to the screen itself when the entry device is absent, will prompt a transfer of electrical charge and therefore an identification of the coordinates of the entry operation.

According to another aspect, an exemplary embodiment of the invention also relates to a method for entering data on a touchpad of a terminal, a method for entry on a touchpad, using an entry device as described here above, such a method comprising:

a step for the laying down, on a touch-sensitive screen of said terminal, of a device for entering data;

a step for the detection, by the terminal, of the laying down of said device for entering data; and a step for the entry, by a user, of data on the surface of said device for entering data.

According to another aspect, an exemplary embodiment of the invention also relates to a system for entering data comprising a terminal provided with a touch-sensitive screen and a device for entering data as described here above.

5. FIGURES

Other features and advantages shall appear more clearly from the following description of one particular embodiment of the disclosure given by way of a simple illustratory and non-exhaustive example and from the appended figures, of which:

6. DETAILED DESCRIPTION

Figure 1:
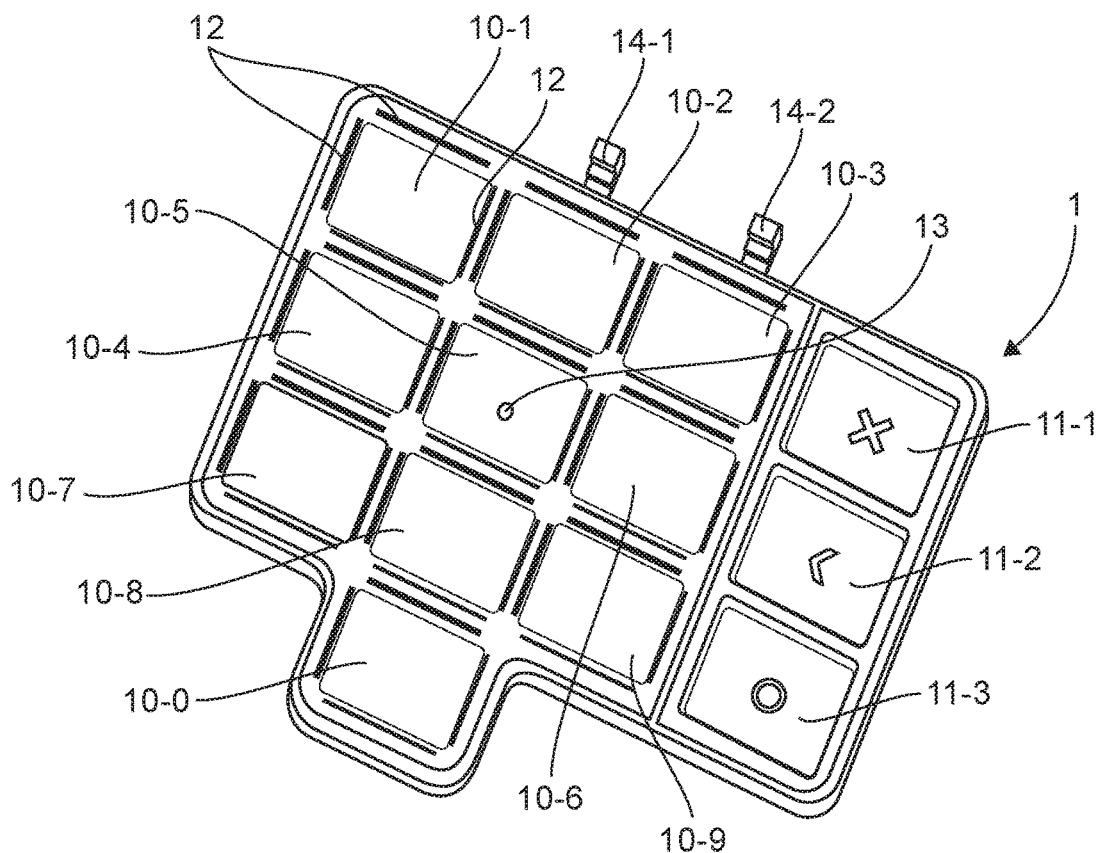
FIG. 1 illustrates a device for entering data according to one embodiment of the invention.

6.1. General Principle of an Exemplary Embodiment of the Invention

An exemplary embodiment of the invention, in its general principle, proposes a physical device for entering data to be laid down on a touchpad of a terminal. The device comprises a plate comprising an upper surface and a lower surface that is generally flat. The upper surface comprises a keypad-forming matrix of entry zones. The bottom of the matrix of entry zones is thin enough for pressure on this matrix to be detected by the touch-sensitive screen through the plate. When the device is laid down on the touch-sensitive screen (whether randomly or on a specific zone of this screen), the user (for example a visually impaired person) can directly touch the keys on the matrix of entry zones to enter characters on the touch-sensitive screen. In this general embodiment, it is not necessary to have additional electrical components to detect the keys on the entry zones of the device for entering data: this is because of the thinness of the bottom of the matrix of the entry zones. In general, the bottom of this matrix has a thickness of the order of 1 mm so that the touch of the finger can be properly sensed. This thickness is naturally adaptable to the material used to form the plate in question. In general, the thickness of the device can range from 1 mm to 3 mm.

The dimensions and layout of the keys of the matrix of entry zones can be known beforehand by the users so that they can locate their own positions on the matrix of entry zones. The matrix of entry zones can also include embossed or hollow patterns so that users can locate their own positions even without prior knowledge of the dimensions and layouts of the entry matrix.

In at least one embodiment, the lower face of the plate can optionally include at least one electrically charged contact zone. This electrically charged contact zone enables the terminal to detect the presence and/or the position of the device for entering data (several contact zones in this case). Thus, the touch-sensitive screen is capable of detecting the presence and/or the position of the device for entering data. The communications terminal can therefore know the position of the matrix of entry zones relative to the position of the electrically charged contact zone, and also the dimensions and layouts of the matrix of entry zones (when several types of matrices different in terms of size as well as function or number of keys are envisaged). More particularly, in this type of embodiment, the lower face of the plate comprises for example three electrically charged contact zones: a first zone is positioned at the upper left-hand corner of the lower face of the plate. The other two zones are positioned so that the first zone forms the right angle of a non-isosceles right triangle. The communications terminal comprises a specific application or a module that enables the identification of this triangle and therefore makes it possible to know the position and orientation of the entry device relative to the screen. In this way, when the user enters information (for example a PIN code) through the entry device, the terminal is capable of recognizing the characters entered (whatever the position and orientation of the device), without even needing to display the keypad on the screen. The entry device of an exemplary embodiment of the invention therefore increases the level of security of the entry of a piece of information on a touch-sensitive screen. The use of electrically charged contact zones is not the only way to raise the level of security offered during the entry of information. Other techniques can also be implemented. To secure the entry of data, it is necessary and sufficient that the implementing of the device for entering data should prompt the recognition of a model that can be used to identify the device or the uniquely entered key. Using this characteristic, it is therefore not necessary to display a keypad on the screen of the communications terminal. Thus, a malicious individual cannot discover the information entered by viewing the screen. The terminal can therefore detect the contact between a finger or a stylus and an entry key of the matrix of entry zones. The character corresponding to the entry key is determined by the terminal according to the position of the preliminarily computed entry device. In other embodiments, the terminal detects the position at which the entry device must be laid down and then asks a user to lay down the entry device at this position. Once the entry device is laid down at the position indicated by the communications terminal, the user can use the entry device to enter data.

The advantages given by the entry device of an exemplary embodiment of the invention are many. First of all it enables visually impaired persons to make data entries on touch-sensitive screens by themselves. It also enables entries to be made by persons who do not have any particular disability but are not comfortable with touch-sensitive screens. It also raises the level of security of data entries (especially confidential data entries) on touch-sensitive screens and does not require the display of a virtual keypad: it prevents malicious persons from identifying the data entered.

6.2. Description of One Embodiment of the Invention

Figure 2:
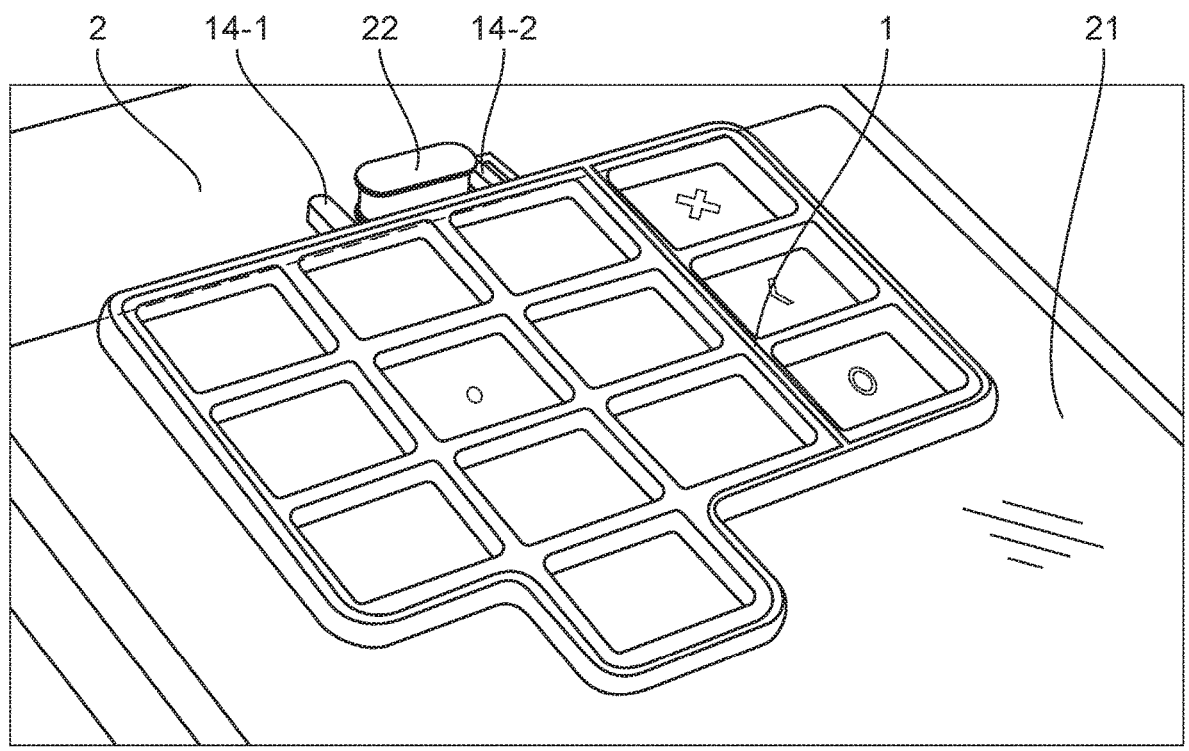
FIG. 2 illustrates the device for entering data laid down on a touchpad of a terminal.

Referring to FIGS. 1 and 2, we describe an embodiment of the device for entering data according to the invention. As illustrated in FIGS. 1 and 2, the device for entering data comprises a plate 1 that is to be laid down on a touchpad 21 of a communications terminal 2. The plate 1, which is generally rectangular, consists of plastic material (which may be transparent) and comprises an upper face (illustrated in FIGS. 1 and 2) and a lower face (which cannot be seen in FIGS. 1 and 2).

The upper face comprises a keypad-forming matrix of entry zones. The matrix of entry data comprises a set of rectangular entry keys grouped together in a first subset and a second subset. The set of entry keys represents an entry keypad for entering confidential code into a payment terminal. The first subset comprises ten numeric keys 10-1, 10-2, 10-3, 10-4, 10-5, 10-6, 10-7, 10-8, 10-9 and 10-0 representing the digits 1, 2, 3, 4, 5, 6, 7, 8, 9 and 0. The numeric keys are generally flat and comprise no specific indication about the digits that these numeric keys represent. This prevents a malicious person from watching the keys that are being used for entry. The key for the digit 5 comprises, at its center, a position-locating point 13. The keys for the digits 1 to 4 and 6 to 9 are positioned around the digit 5 key in the usual way. Locating the position of the digit 5 key enables the visually impaired user to get a rapid, mental picture of the positions of the other numeric keys. The second subset comprises three function keys: a "cancel" key 11-1, an "erase" (correction) key 11-2 and a "confirm" key 11-3. The function keys comprise embossed or hollow patterns indicating the functions of the keys. For example, the pattern "X" represents the cancel function, the pattern "<" represents the erase function and the pattern "O" represents the confirm function. The keys of the matrix of entry zones are separated from one another by a grid of profiled elements 12 of predetermined heights and shapes. The shapes of the profiled elements of the grid of profiled elements are adapted to form a plurality of position-locating markers for the keys of the keypad. More particularly, the profiled elements form one or more common threads that enable a visually impaired user to mentally locate the position of the keys. For example, the profiled elements form a peripheral common thread throughout the rim of the entry device enabling the external volume of the entry device to be delimited. At each key, profiled elements also indicate the location of the key.

The thickness of the plate in the zone of the function keys is smaller than its thickness in the zone of the digital keys. There is thus a change in level between the numeric keys and the function keys. This change in level enables visually impaired persons to easily identify the numeric keys and the function keys.

In the embodiment illustrated in FIG. 1, the device for entering data also comprises two attachment pins 14-1, 14-2. FIG. 2 illustrates the device for entering data laid down on a touch-sensitive screen 21 of a communications terminal 2 acting as a payment terminal. An attachment element 22 is disposed at the edge of the touch-sensitive screen. The two attachment pins 14-1, 14-2 grip the attachment element 22 on both sides so as to prevent the device for entering data from slipping relative to the screen of the communications terminal. These two attachment pins 14-1, 14-2 ensure that the device for entering data is laid down on a determined area on the touch-sensitive screen.

The payment terminal 2 and the device for entering data 1 constitute a data entry system, for example for visually impaired persons.

Figure 3:
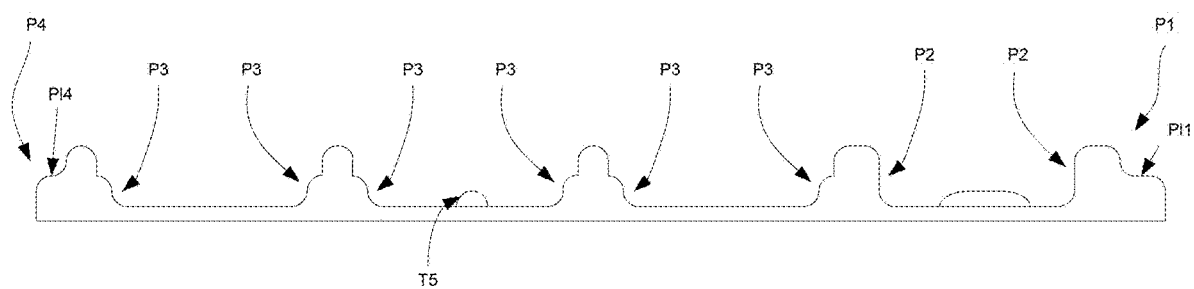
FIG. 3 is a view in section of an entry device on a third row of keys presenting one embodiment of the position-locating profiled elements.

FIG. 3 is an illustration, given by way of an example, of a possible longitudinal section of the device of FIG. 1 at the position of the central keys. It illustrates one embodiment of the different outlines of the keys. A first outline P1 is used to determine the right lateral edge of the entry device. The outline P2 of the correction key (see FIG. 1) takes the form of a vertical drop. The outlines P3 of the numeric keys are generally wavy. They are different from the outline P2 and enable the visually impaired user to differentiate the numeric keys from the function keys. The left external outline (P4) is also different from the right external outline (P1), especially in the size of the plates (PL4 as contrasted with PL1), thus enabling the user to determine the orientation of the device when it is laid down on the screen. The point of the key 5 (T5) is also visible on this key and enables rapid identification of the key 5.

6.3. Method for Entering Data

An exemplary embodiment of the invention also relates to a method for entering data on a touchpad of a terminal and using the device for entering data for visually impaired persons. Such a method comprises:
 a step for the laying down, on a zone of the touch-sensitive screen of the terminal, of a device for entering data as described here above;

an optional step for the detection, by the terminal, of the laying down of the device (the optional nature of this step depends on the characteristics of the device and enables the detection of the orientation and size of the device if necessary);

a step of entry, by a user, of data on the surface of the device for entering data.

The step for laying down can be preceded by a step for displaying a laying zone on the screen of the terminal, this laying zone being determined by the terminal itself. The entry device can thus be laid down on the receiving zone, displayed on the screen, by a sighted person (in the case of use by a visually impaired person). In this case, the attachment pins and the attachment element are not needed. As an alternative, the laying step can include a step for laying down the lower surface of the device for entering data on the touch-sensitive screen so that the two attachment pins grip the attachment element of the terminal. The two attachment pins and the attachment element make sure that the entry device is laid down on the determined zone of the touchscreen.

According to one variant of this method, the entry device is laid down on a random zone of the touch-sensitive screen of the terminal. In this case, the method furthermore comprises a step for determining the position of the device for entering data. The step for determining can include a detection of contact of one or more fingers with the keys of the matrix of the entry zones (for this purpose, the communications terminal requires an entry, by the user, of a series of predetermined keys (for example 5-1-3) to determine the position of the entry device on the screen). The position of the entry device can thus be determined according to the position of the key characters that have been entered, either simultaneously or successively. For example, the visually impaired person can touch the numeric keys 1 and 9 with two fingers when the entry device is laid down on the touch-sensitive screen. The terminal can thus detect the positions of the keys 1 and 9. According to the positions of the keys 1 and 9, the terminal can identify the position of the keypad matrix on the touch-sensitive screen.

When the device is provided with independent detection means (electrically charged contact zones, for example), then it is not necessary resort to a method of pre-entry by the user: the communications terminal detects only the laying down of the entry device and the position of this laying down on the screen and can then compute the position of the keys and therefore interpret the entries made by the user.

Although the present disclosure has been described with reference to one or more examples, workers skilled in the art will recognize that changes may be made in form and detail without departing from the scope of the disclosure and/or the appended claims.

The invention claimed is:

1. A device for entering data, to be laid down on a touchpad of a terminal, the device for entering comprising:
    an appreciably parallelepiped-shaped plate, said plate comprising:
        an upper face, at least one part of which comprises a keypad-forming matrix of entry zones, comprising a set of entry keys, separated from one another other by a grid of profiled elements, of predetermined heights and/or shapes, such that a thickness of the entry zones is sufficient to enable a detection of a finger by said touchpad; and
        a lower, appreciably flat face for laying down said device thereon, said lower face comprising at least a first, a second and a third electrically charged contact zones enabling the terminal to detect a presence and a position of said device for entering data at a plurality of orientations.

2. The device according to claim 1, wherein the device is constituted by transparent plastic material.

3. The device according to claim 1, wherein at least one subset of the set of entry keys of the matrix of entry zones is appreciably rectangular in shape.

4. The device according to claim 3, wherein the shapes of the profiled elements of the grid of profiled elements are suited to forming a plurality of position-locating markers for locating the position of said keys of said keypad.

5. The device according to claim 1, wherein said set of entry keys comprises 13 keys, said set being sub-divided into a subset of ten numeric keys representing a numeric keypad and a subset of three confirmation keys.

6. The device according to claim 5, wherein a position corresponding to key number five has a position-locating point at its center.

7. The device according to claim 1, wherein the thickness of said plate ranges from 1 mm to 3 mm.

8. A method for entering data on a touchpad of a terminal, the method for entering comprising:
    laying down, on a touch-sensitive screen of said terminal, a device for entering data, comprising:
        an appreciably parallelepiped-shaped plate, said plate comprising:
            an upper face, at least one part of which comprises a keypad-forming matrix of entry zones, comprising a set of entry keys, separated from one another other by a grid of profiled elements, of predetermined heights and/or shapes, such that a thickness of the entry zones is sufficient to enable a detection of a finger by said touchpad; and
            a lower, appreciably flat face laying down said device thereon, said lower face comprising at least a first, a second and a third electrically charged contact zones enabling the terminal to detect a presence and a position of said device for entering data at a plurality of orientations;
    detecting, by the terminal, the laying down of said device for entering data; and
    entering, by a user, data on the upper face of said device for entering data.

9. A system for entering data comprising:
    a terminal provided with a touch-sensitive screen; and
    a device for entering data comprising:
        an appreciably parallelepiped-shaped plate, said plate comprising:
            an upper face, at least one part of which comprises a keypad-forming matrix of entry zones, comprising a set of entry keys, separated from one another other by a grid of profiled elements, of predetermined heights and/or shapes, such that a thickness of the entry zones is sufficient to enable a detection of a finger by said touch-sensitive screen; and
            a lower, appreciably flat face for laying down said device thereon on the touch-sensitive screen of the terminal, said lower face comprising at least a first, a second and a third electrically charged contact zones enabling the terminal to detect a presence and a position of said device for entering data at a plurality of orientations.

10. The device according to claim 1, wherein the first, second and third contacts are positioned on the lower face to form a shape that is detectable by the terminal and enables the terminal to detect both the presence and orientation of the device for entering data.

11. The device according to claim 10, wherein the shape is a non-isosceles right triangle.

12. The method according to claim 8, wherein the first, second and third contacts are positioned on the lower face to form a shape that is detectable by the terminal and enables the terminal to detect both the presence and orientation of the device for entering data.

13. The method according to claim 12, wherein the shape is a non-isosceles right triangle.

14. The method according to claim 12, wherein the device for entering data is positionable on the touchpad at the plurality of orientations and wherein the detecting by the terminal comprises detecting the position of the device for entering data at any of the plurality of orientations.

15. The system according to claim 9, wherein the first, second and third contacts are positioned on the lower face to form a shape that is detectable by the terminal and enables the terminal to detect both the presence and orientation of the device for entering data.

16. The system according to claim 15, wherein the shape is a non-isosceles right triangle.

* * * * *